(12) United States Patent
Chartier

(10) Patent No.: US 7,100,109 B1
(45) Date of Patent: Aug. 29, 2006

(54) IDENTIFYING URL REFERENCES IN SCRIPT INCLUDED IN MARKUP LANGUAGE DOCUMENTS

(75) Inventor: Daniel P. Chartier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 10/175,224

(22) Filed: Jun. 17, 2002

(51) Int. Cl.
*G06N 3/00* (2006.01)
(52) U.S. Cl. .................................................... 715/513
(58) Field of Classification Search ................ 715/513, 715/516, 517, 523, 530; 345/326; 707/102
See application file for complete search history.

(56) References Cited

U.S. PATENT DOCUMENTS

| | | | | |
|---|---|---|---|---|
| 5,761,683 A | * | 6/1998 | Logan et al. ................ | 715/513 |
| 6,009,429 A | * | 12/1999 | Greer et al. ................... | 707/10 |
| 6,009,441 A | * | 12/1999 | Mathieu et al. ............. | 715/516 |
| 6,240,455 B1 | * | 5/2001 | Kamasaka et al. .......... | 709/229 |
| 6,253,204 B1 | * | 6/2001 | Glass et al. .................. | 707/102 |
| 6,321,242 B1 | * | 11/2001 | Fogg et al. .................. | 715/513 |
| 6,578,078 B1 | * | 6/2003 | Smith et al. ................ | 709/224 |
| 6,763,496 B1 | * | 7/2004 | Hennings et al. ........ | 715/501.1 |
| 2002/0097268 A1 | * | 7/2002 | Dunn et al. ................. | 345/760 |

* cited by examiner

*Primary Examiner*—Stephen Hong
*Assistant Examiner*—Kyle R. Stork
(74) *Attorney, Agent, or Firm*—Ronald M. Anderson

(57) ABSTRACT

A keyword adjective is used to identify a URL or address within script included in a markup language document. A Web page, or hypertext markup language document that includes script cannot readily be parsed to identify the URL or address. The present invention includes a predefined identifier as a keyword adjective immediately preceding the string comprising the URL or address referenced within script conforming to the European Computer Manufacturers Association (ECMA) specification. Use of the keyword adjective in this manner facilitates identification of the URL or address. Once thus identified, the URL or address can be modified to fix a broken link. This approach can also be used more generally to identify other entities (other than an address) for an object referenced in the script.

23 Claims, 2 Drawing Sheets

MYFUNC( "IMAGES\IMAGE1.GIF", 1, "ONE" );

MYFUNC( /*URL*/ "IMAGES\IMAGE1.GIF", 1, "ONE" );

IDENTIFYING URL REFERENCES IN SCRIPT INCLUDED IN MARKUP LANGUAGE DOCUMENTS

FIELD OF THE INVENTION

The present invention generally pertains to identifying references to uniform resource labels (URLs) within markup language documents, and more specifically, to identifying URL strings within script included in such a document by detecting that the URL string is preceded with a predefined adjective.

BACKGROUND OF THE INVENTION

Web pages, which are typically written in hypertext markup language (HTML), frequently include URLs that refer to the location of objects referenced in the Web pages. For example, an image in a Web page might be referenced by a URL or hyperlink that provides the address or path to the image where it is stored on a server accessible over the Internet or other network. When the Web page is retrieved by a client from a server for loading and display with a browser program running on the client, the image is retrieved over the network from the storage location to which the URL points.

Referencing a URL in a tag included in the HTML or other markup language used to define a Web page document is a straightforward process. For example, an image of a rose included in a file "rose.jpg" that is stored in a folder "flowers" on a server "myserver.com" can be referenced by including the following tag in the HTML defining the Web page:

<p><img border="0" src="http://www.myserver.com/flowers/rose.jpg"></p>.

A URL that references an object in an HTML document within a tag is readily identifiable so that it can be employed to retrieve the object from the indicated storage address for the object, for use by a browser program. Also, it may be necessary to update the URL if the storage location at which the object referenced has been changed, to fix a broken link to the object. A commonly assigned, copending patent application, U.S. Ser. No. 09/285,530, entitled "METHOD FOR PRESERVING REFERENTIAL INTEGRITY WITHIN WEB SITES," which was filed Apr. 2, 1999, discloses a method for automatically updating or fixing URLs (or hyperlinks) referencing Web pages or objects that have been moved to a different storage location so that the links are correct; the disclosure and drawings of this commonly assigned, copending application are hereby specifically incorporated herein by reference.

The technique for fixing links that have been broken due to changes in the storage address of an object will fail if the URL or hyperlink to a page or object that is referenced in an HTML document cannot be determined. HTML documents often include "event handlers," or attributes on an HTML object or element that contain script called during a specific event, such as when a mouse or other pointing device is clicked on the object. Script frequently includes URLs that cannot be fixed using the hyperlink fix up mechanism noted above. The invention disclosed in the above-referenced application is currently included as part of the server extensions associated with Microsoft Corporation's FRONTPAGE™ Web site creation and maintenance program.

The most popular scripting language used for event handlers on a Web page is ECMAScript, which conforms to the European Computer Manufacturers Association (ECMA) specification for script. ECMAScript is an implementation of the JavaScript and Jscript languages. Because URLs in the ECMAScript portion of an HTML document cannot be recognized using conventional techniques, means must be provided to facilitate the identification of such URLs and addresses. It might seem trivial to apply a heuristic to solving this problem, such as assuming that any string containing "http://" is a URL, but that assumption is incorrect. For example, a script might include a function that refers to a URL for an image file in the following manner:

myfunc("images\image1.gif", 1, "one").

Note that this script function does not include "http://", and therefore, the trivial heuristic approach mentioned above would be unable to recognize the path or address to "image1.gif" as a URL. Accordingly, if the location at which the file "image1.gif" was stored is changed to a different folder, the address or URL provided in the script for "myfunc" will be broken (unless manually corrected) and not fixable using the automated fix up capability of the FRONTPAGE program server extensions. Accordingly, a different approach is required to enable a URL referenced in a ECMAScript portion of a Web page to be detected, so that it can be fixed or put to other uses.

SUMMARY OF THE INVENTION

To enable URLs included in script in an HTML or other markup language document to be detected, where the scripting language supports spanning comments (that can span more than one line), the present invention employs a relatively simple approach. Script functions can include a C language style comment suitable for use in the present invention. To identify a URL or link to a location of an object that is referenced in a script portion of a markup language document, a predefined indicator in the form of a comment is added to the script adjacent to the address of the object, much like an "adjective" modifies a noun. The reference to the address is preferably preceded by the comment, which then enables the URL or address of the object to be detected. The predefined indicator preferably includes the acronym "URL." Although other addresses can be identified in this manner, the address preferably comprises an Internet address. Furthermore, the present invention can be employed to identify other entities and is not limited to just identifying an address.

Another aspect of the present invention is directed to a memory medium having machine readable instructions for enabling a user to carry out the steps of this method.

Another aspect of the present invention is directed to detecting an address that identifies a location of an object in a script portion of a Web page document. The Web page document is parsed to identify the predefined indicator in the comment within the script portion. The address is detected because of its disposition adjacent to the predefined indicator. More specifically, a string literal element that follows immediately after the predefined indicator is automatically detected as the address of the object. Preferably, the script portion conforms to ECMA specification for script, and the Web page document is written in a markup language, such as HTML.

Another aspect of the present invention is directed to a memory medium having machine readable instructions for carrying out the steps of detecting the address of the object. Yet another aspect is directed to a system for detecting an address that identifies a location of an object in a script portion of a Web page document. This system includes a memory in which the Web page document and a plurality of machine instructions are stored. A processor that is coupled to the memory to access the Web page document and the machine instructions executes the machine instructions, which causes the processor to carry out a plurality of functions, generally consistent with the steps of the method for detecting an address as noted above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing the Present Invention

Figure 1:
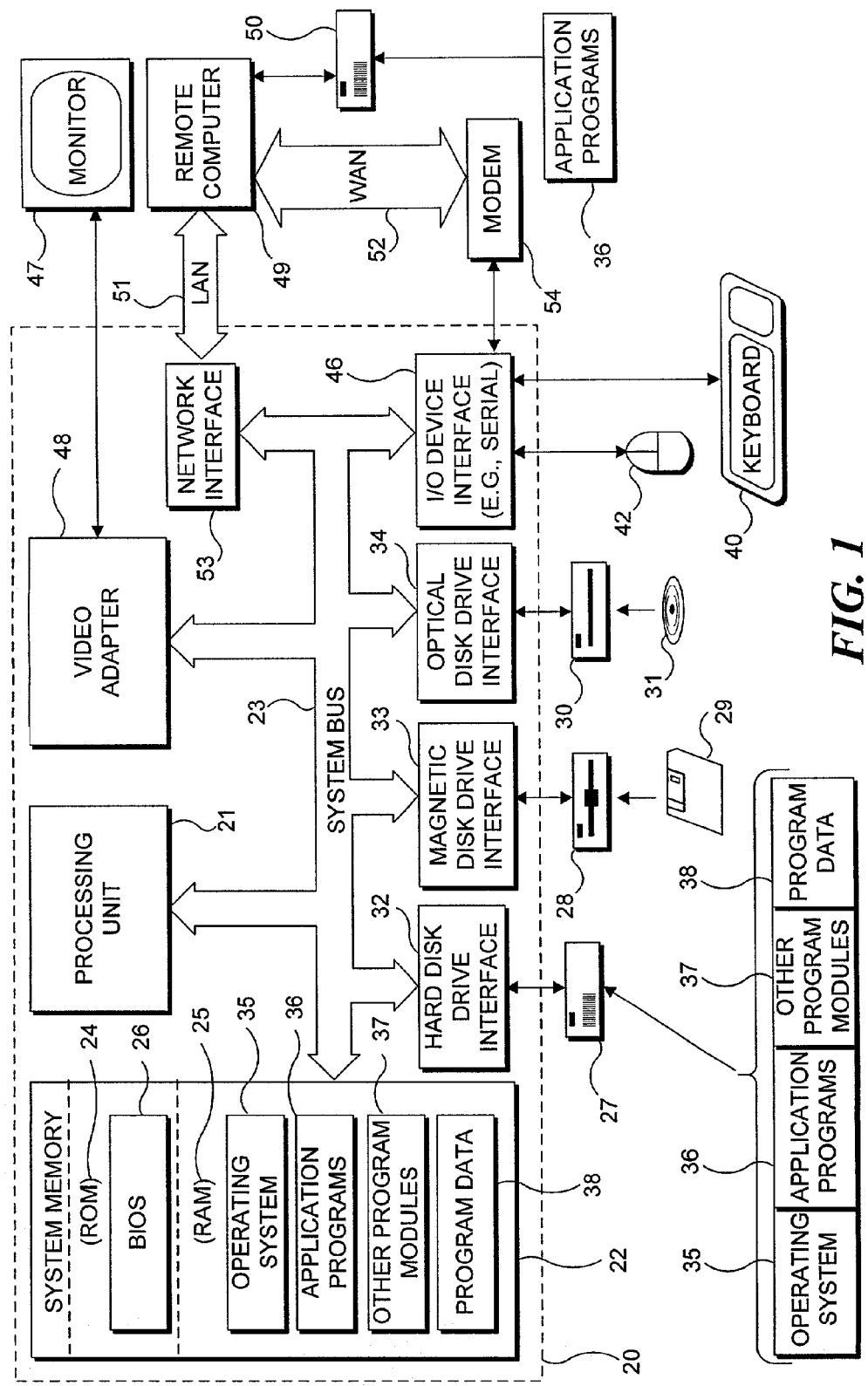
FIG. 1 is a functional block diagram of a generally conventional personal computer system that is suitable for implementing the present invention.

FIG. 1 and the following discussion related thereto are intended to provide a brief, general description of a suitable computing environment in which the present invention may be implemented. This invention is preferably practiced using one or more computing devices that typically include the functional components shown in FIG. 1. Although not required, the present invention is described as employing computer executable instructions, such as program modules that are executed by a processing device. Generally, program modules include application programs, routines, objects, components, functions, data structures, etc. that perform particular tasks or implement particular abstract data types. Also, those skilled in the art will appreciate that this invention might conceivably be practiced with other computer system configurations, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like.

With reference to FIG. 1, an exemplary system for implementing the present invention (corresponding to the server or client) includes a general purpose computing device in the form of a personal computer 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within computer 20, such as during start up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disc 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, the image files, and other data for personal computer 20. Although the exemplary environment described herein employs a hard disk, removable magnetic disk 29, and removable optical disc 31, it will be appreciated by those skilled in the art that other types of computer readable media, which can store the images files and other data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disc 31, or in ROM 24 or RAM 25, including an operating system 35, one or more application programs 36, other program modules 37, and program data 38. A user may enter commands and information into personal computer 20 through input devices such as a keyboard 40, graphics pad, and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port, a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, Web pages, the original and decompressed image files, and/or other information. In addition to the monitor, the server may be coupled to other peripheral output devices (not shown), such as speakers (through a sound card or other audio interface, not separately shown), and printers.

Personal computer 20 may be included in a networked environment using logical connections to connect it to one or more other computers, such as a remote computer 49. Remote computer 49 may be a server, a router, a network PC, a peer device, or a satellite or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are well known and are common in offices, enterprise wide computer networks, intranets, and the Internet.

When used in a LAN networking environment, personal computer 20 is connected to LAN 51 through a network interface or adapter 53. When used in a WAN networking environment, personal computer 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46; i.e., through a serial port. In a networked environment, data, and program modules depicted relative to personal computer 20, or portions thereof, may be stored in the remote memory storage device. It will be appreciated that the network connections shown are exemplary and other means of establishing a communications link between the computers may be used, such as wireless communication and wideband network links.

Logical Steps for Identifying a URL or Address of an Object

Figures 2, 3A, 3B:
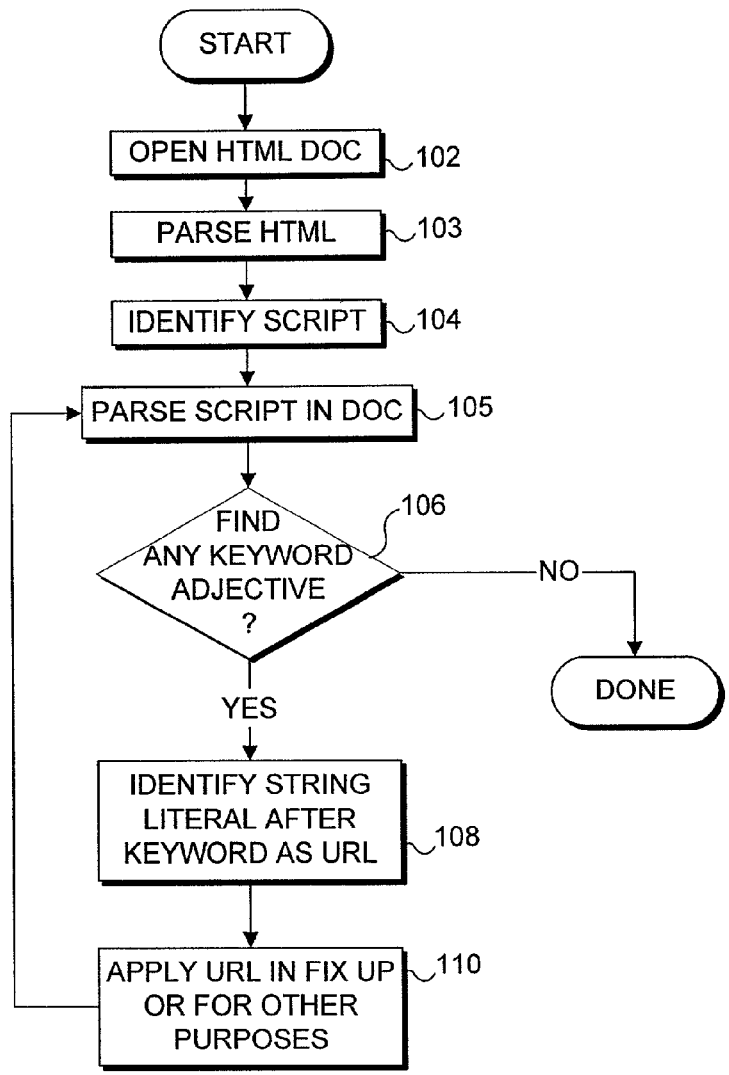
FIG. 2 is a flow chart illustrating the logical steps carried out in the present invention, to identify a URL or address string within script in an HTML document.
FIG. 3A is an exemplary ECMAScript function that includes a reference to a URL or address where an image is stored.
FIG. 3B is the exemplary ECMAScript function of FIG. 3A, modified in accord with the present invention to include a predefined comment that identifies a string for the URL or address of the image, so that the URL or address can be detected.

With reference to FIG. 2, the steps that are implemented by the processor of a computing device in carrying out the present invention are illustrated in a flow chart 100. For example, if PC 20 is running Microsoft Corporation's FRONTPAGE™ program, the server extensions associated with this program can employ the present invention to identify a URL or address within script included within an HTML or other markup language document. Accordingly, step 102 calls for the HTML document to be opened; i.e., loaded into the memory of the computing device. Next, in a step 103, the computing device parses the HTML document. A step 104 identifies the appropriate script sections in the HTML document that may include an entity for an object referenced in the script. In a step 105, the script sections thus identified are parsed. When parsing the script sections, the computing device is attempting to identify any keyword adjective inserted to indicate where a string comprising the URL or address for the object referenced in the script is located. Alternatively, in other applications of the present invention, some other entity for the object besides its URL or address may be identified.

In a preferred embodiment, the keyword adjective comprises a "C" language style comment that includes a predefined indicator "/*URL*/" immediately preceding a string that references the actual address of an object or Web page within the script. It will be appreciated that a user can manually insert this predefined identifier into the script. Alternatively, it is contemplated that a Web page editing program can automatically insert the predefined indicator if the user selects the URL or address with a mouse or other pointer and then activates a control (not shown) in the Web page editing program that inserts the predefined indicator before the selected URL or address.

FIG. 3A illustrates an exemplary function 120 identified as "MYFUNC." Function 120 would normally appear as shown, with an address that includes a reference to a folder 122 and a file identifier 124, which together, define the path to the referenced file. The URL or address might also include a reference to a Web server label as part of the path. This example also includes other parameters associated with function 120. In the format shown in FIG. 3A, it would not be possible for a URL fix up function to readily identify the URL or address that is included within the script for function 120. However, as shown in FIG. 3B, the present invention corrects this problem by inserting the predefined identifier 126, /*URL*/, immediately preceding the first portion of the URL or address, i.e., just before folder 122 in this example.

Referring back to FIG. 2, a decision step 106 determines if a keyword adjective comprising the predefined identifier has thus been found when parsing the script within the document. If not, the procedure is done. However, if the keyword adjective employed to identify a URL has been found, a step 108 provides for identifying the string literal that immediately follows the keyword adjective (i.e., the predefined identifier) as the URL or address (or other entity—if used to identify some other entity for the referenced object). A step 110 then provides for applying the URL, for example, to fix a broken link in the event that the address of file identifier 124 has been changed because it has been moved to a new storage location. It is also contemplated that the identification of a URL or address within a script portion of a markup language document can be used much more generally, and for other purposes besides correcting the URL or address of an object that is being referenced in the script of a markup language document. For example, to identify references to HTML identifiers in ECMAScript, the specific keyword adjective /*ID*/ can be used in accord with the present invention. The ability to identify such references can be very important during copy and paste operations, where ID's are sometimes changed. Accordingly, while a specific keyword adjective, /*URL*/, is used in the preferred embodiment discussed in detail above, it should be understood that almost any predefined identifier could instead be employed. Accordingly, the predefined identifier is not limited to the specific keyword adjective used in this embodiment and is not limited to identifying only addresses.

Although the present invention has been described in connection with the preferred form of practicing it and modifications thereto, those of ordinary skill in the art will understand that other modifications can be made to the present invention within the scope of the claims that follow. Accordingly, it is not intended that the scope of the invention in any way be limited by the above description, but instead be determined entirely by reference to the claims that follow.

The invention claimed is:

1. A method implemented by a computing device for identifying a reference to an entity for an object in a script portion of a markup language document, comprising the steps of:
    (a) inserting a comment adjacent to the reference to the entity in the script portion of the markup language document, wherein the comment is a predefined construct specified for use in the script portion of the markup language document to indicate non-executable information; and
    (b) including in the comment a predefined indicator that designates the entity for the object in the script portion, wherein the entity comprises a specific keyword adjective referencing the object.

2. The method of claim 1, wherein the step of inserting comprises the step of preceding the reference to the entity with the comment.

3. The method of claim 1, wherein the predefined indicator comprises an acronym.

4. The method of claim 1, wherein the predefined indicator includes an acronym for a uniform resource indicator of the object.

5. The method of claim 1, wherein the entity comprises an Internet address.

6. A memory medium having machine readable instructions for enabling a user to carry out the steps of claim 1.

7. A method implemented by a computing device for detecting an address that identifies a location of an object, in a script portion of a Web page document, comprising the steps of:

(a) parsing the Web page document to identify the script portion;
(b) identifying a predefined indicator in a comment within the script portion;
(c) detecting the address based upon its disposition adjacent to the predefined indicator; and
(d) implementing a function that employs the address thus detected.

8. The method of claim 7, wherein the step of detecting the address comprises the step of identifying a string literal element that follows immediately after the predefined indicator, as the address.

9. The method of claim 7, wherein the predefined indicator comprises an acronym.

10. The method of claim 7, wherein the predefined indicator comprises an acronym for uniform resource locator.

11. The method of claim 7, further comprising the step of updating the address in the script to designate a changed location of the object in a storage, using one of a relative updated address and an absolute updated address.

12. The method of claim 7, wherein the address is an Internet address that includes a Web site and a path.

13. The method of claim 7, wherein the script portion conforms to a European Computer Manufacturers Association specification for script.

14. The method of claim 7, wherein the Web page document is written in a markup language.

15. A memory medium having machine readable instructions for carrying out the steps of claim 7.

16. A system for detecting an entity for an object referenced in a script portion of a Web page document, comprising:
(a) a memory in which the Web page document and a plurality of machine instructions are stored;
(b) a processor that is coupled to the memory to access the Web page document and the machine instructions, said processor executing the machine instructions, causing the processor to carry out a plurality of functions, including:

(i) parsing the Web page document to identify the script portion;
(ii) identifying a predefined indicator in a comment within the script portion, wherein the comment is a predefined construct specified for use in the script portion of the markup language document to indicate non-executable information; and
(iii) detecting the entity for the object referenced in the script portion, based upon a disposition of the entity adjacent to the predefined indicator, wherein the entity comprises a specific keyword adjective referencing the object.

17. The system of claim 16, wherein the machine instructions further cause the processor to identify a string literal element that follows immediately after the predefined indicator, as an address for the object.

18. The system of claim 17, wherein the machine instructions further cause the processor to update the address in the script to designate a changed location of the object in a storage, using one of a relative updated address and an absolute updated address.

19. The system of claim 17, wherein the address is an Internet address that includes a Web site and a path.

20. The system of claim 17, wherein the predefined indicator comprises an acronym for uniform resource locator.

21. The system of claim 16, wherein the predefined indicator comprises an acronym.

22. The system of claim 16, wherein the script portion conforms to a European Computer Manufacturers Association specification for script.

23. The system of claim 16, wherein the Web page document is written in a markup language.

* * * * *